Patented Jan. 29, 1952

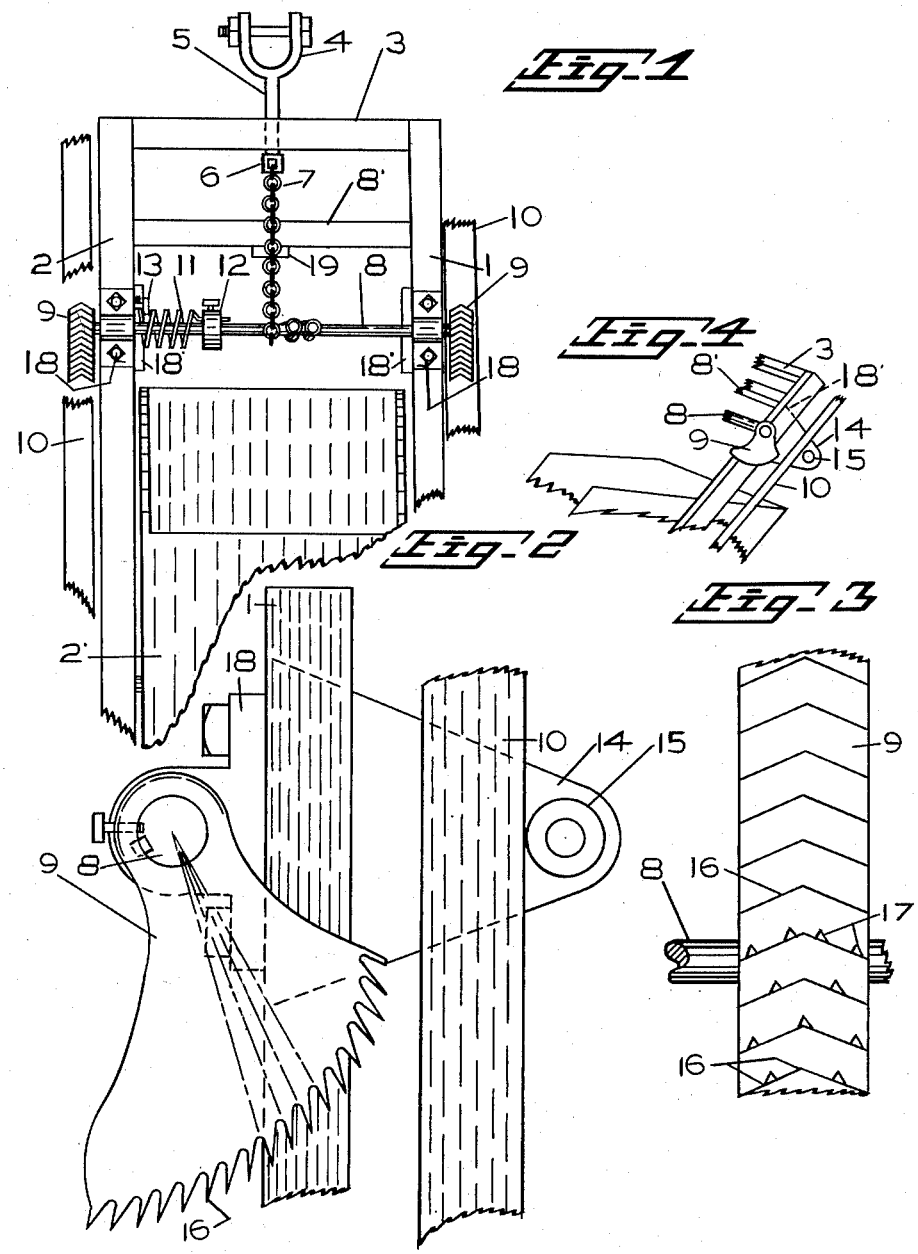

2,583,907

UNITED STATES PATENT OFFICE 2,583,907

SAFETY DOG FOR ELEVATORS AND MINE CAGES

George Vaydo, Princeton, British Columbia, Canada

Application February 3, 1950, Serial No. 142,123
In Canada February 4, 1949

2 Claims. (Cl. 187—86)

My invention relates to safety devices for mine cages, skips and elevators, and more particularly having reference to an improved dog adapted to more effectively engage a safety rail.

In the art to which the invention relates, cages or skips as used in mining operations are provided with a pivotally mounted safety dog adapted to be actuated if the cage supporting cable breaks and to engage a safety rail. More usually the dog provides a series of teeth and the safety rail is of wood. In the dog, as at present in use, the teeth cut into the wood and the interstices between teeth clog with wood cuttings, reducing the effective engagement of the dog.

The present invention contemplates improvement in devices of this character in which a dog is provided shaped to more effectively bring the teeth into engagement with the wooden safety rail, and further having the teeth formed to discharge cuttings from the rail and maintain the teeth clear for most effectively biting into the rail.

One of the objects of the invention is accordingly to provide an improved dog for mine cage or skip safety devices, adapted to more effectively engage the safety rail for the cage or skip, and having improved teeth by which the dog may bite into the rail without clogging the teeth.

Other features and advantages of the invention will become apparent by reference to the accompanying description taken in conjunction with the drawings wherein like characters of reference are used to indicate like parts throughout the several views, and wherein—

Fig. 1 is a side view of a fragment of the mine cage or skip showing the cable attachment and the mounting of the safety dogs.

Fig. 2 shows a detail side view of the dog mounted on the cage or skip frame in engageable relation to a safety rail, the rail and cage being shown broken away.

Fig. 3 is a fragmentary edge view of a dog shown on its shaft.

Fig. 4 is a detail perspective view showing the arrangement of skip, safety rail and dog.

Having reference to the drawings, the mine cage or skip, for use with which my improved dog is adapted, more usually provides upright parallel frame members 1 and 2, with intermediate cross bar 8' reinforced as at 19, and top cross bar 3 to which a clevis 4 is attachable and to which the cage or skip hoisting cable is secured. The cross bar 3 provides a suitable opening for reception of the shank 5 of the clevis. On the lower end of the shank 5 is threaded a block 6 to which is attached a chain 7 secured to a shaft 8, the shaft being mounted for rotation transversely on the frame side members 1 and 2 in bearing brackets 18.

On the shaft 8 is mounted safety dogs 9 that are fixed to the shaft, the dogs being adapted for biting engagement with a safety rail 10 mounted parallel and in juxtaposition to the shaft for travel of the mine cage. The dogs 9 are normally held out of contact with the safety rail by the chain 7 when the cage is suspended by its cable, in which the cage is supported on the block 6. On the shaft 8 is a spring 11 that is secured to the shaft by a collar 12 and to the cage frame member 1 by a bolt or pin 13, the spring being adapted to be tensioned when the cage is suspended, but on release of the clevis 4 the spring would turn the shaft 8 to engage the dogs 9 with the safety rails 10, as would occur if the cable broke. The frame members 1 and 2 may be reinforced by plates 18'.

There is further provided a plate 14 carried fixed on the cage frame and carrying a roller 15 by which the cage is held in relation to the safety rail when pressure of the dog engaging the rail is applied, a similar plate being provided for each dog.

All of the foregoing is in accordance with the usual practice in mine cage or skip operation. The present invention is concerned with improvement in formation of the dogs and teeth to more effectively engage the safety rails.

For this I provide the dogs 9 each with a series of teeth 16 shaped to a herringbone design with rounded gullets and center pitch, adapted to force wood cuttings from the safety rails out so as not to clog the interstices between teeth with wood cuttings and thereby destroy the gripping power of the dogs.

The teeth preferably angle at about twenty-five degrees from the body of the dog and with the grooves or gullets between teeth rounded, and with all teeth inclined to have a center pitch. Additionally I provide the first teeth of the dogs, that is the ones engageable with the safety rails first, with prongs 17, preferably arranged alternately four and three, as in Figure 3, these prongs being adapted to make the initial engagement only into the wood to start the bite of the dogs. While I have shown a 4–3–4–3 arrangement of the prongs, this need not be definitely so restricted. The prongs are only provided on the four teeth initially engaging the safety rails or approximately that number. All teeth are to have a sharp cutting edge.

A dog formed in accordance with the foregoing will engage effectively to bring a runaway cage or skip to a quick stop.

While I have herein disclosed a preferred embodiment of my invention, it is to be understood that changes in the shape of the teeth would be permissible, and in so far as such changes come within the spirit and scope of the invention as defined in the appended claims they would be considered a part hereof.

What I claim and wish to secure by Letters Patent is:

1. A safety dog for mine cages or the like mounted for operation in relation to a wooden safety rail, said dog comprising a solid body providing a series of teeth on the working face of the body, said teeth angling rearwardly both ways from a medial line on the working face of said body and adapted for discharge laterally on both sides of the dog.

2. A device as defined in claim 1 and including a series of pointed prongs projecting from the cutting portions of the teeth first engaging the safety rail.

GEORGE VAYDO.

REFERENCES CITED

The following references are of record in the file of this patent:

UNITED STATES PATENTS

| Number | Name | Date |
| --- | --- | --- |
| 1,165,659 | Fern | Dec. 28, 1915 |
| 1,462,382 | Schonfeld | July 17, 1923 |
| 1,820,427 | Birmann | Aug. 25, 1931 |